INVENTORS
ANDRES FERRARI
NELSON G. KLING
BY Harry Cobb
ATTORNEY

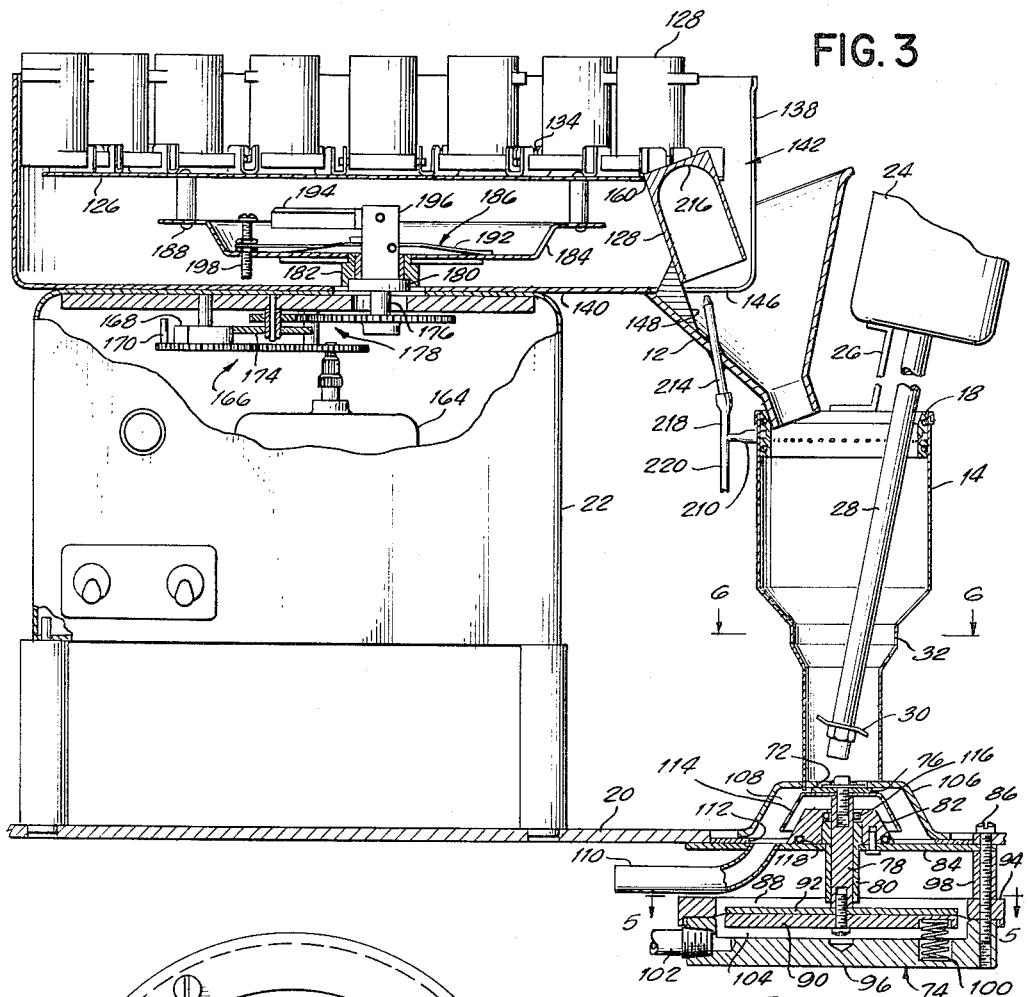

United States Patent Office 3,223,485
Patented Dec. 14, 1965

3,223,485
APPARATUS FOR TREATMENT OF SOLIDS
FOR ANALYSIS
Andres Ferrari, Scarsdale, N.Y., and Nelson G. Kling, Ringwood, N.J., assignors to Technicon Instruments Corporation, Chauncey, N.Y., a corporation of New York
Filed Sept. 7, 1962, Ser. No. 222,013
19 Claims. (Cl. 23—253)

This invention relates to the treatment of solids for quantitative analysis in respect to a known consituent thereof. Such solids can be amphorous, for example powder or granular material, in tablet form, or in other forms.

An object of the invention is the provision of improved apparatus for automatically treating a series of samples of solids, one after the other in succession, to prepare them for analysis in respect to a known constituent thereof and to concurently transmit the treated samples in succession to an automatic analysis apparatus.

Another object of the invention is to provide apparatus of the type indicated with means for automatically washing parts of the apparatus between successive samples.

A further object is the provision of apparatus of the indicated type with improved means for supplying a seties of solids, in succession, to the apparatus.

The above and other objects, features and advantages of the invention will be more clearly understood from the following description of the invention considered in connection with the accompanying illustrative drawings of an embodiment of the invention.

In the drawings:

FIG. 3 is a vertical view, partly in section, of the supply device;

FIG. 5 is a top plan sectional view, on a larger scale, taken on line 5—5 of FIG. 3;

FIG. 6 is a top plan sectional view, on a larger scale, taken on line 6—6 of FIG. 3;

Figure 1:
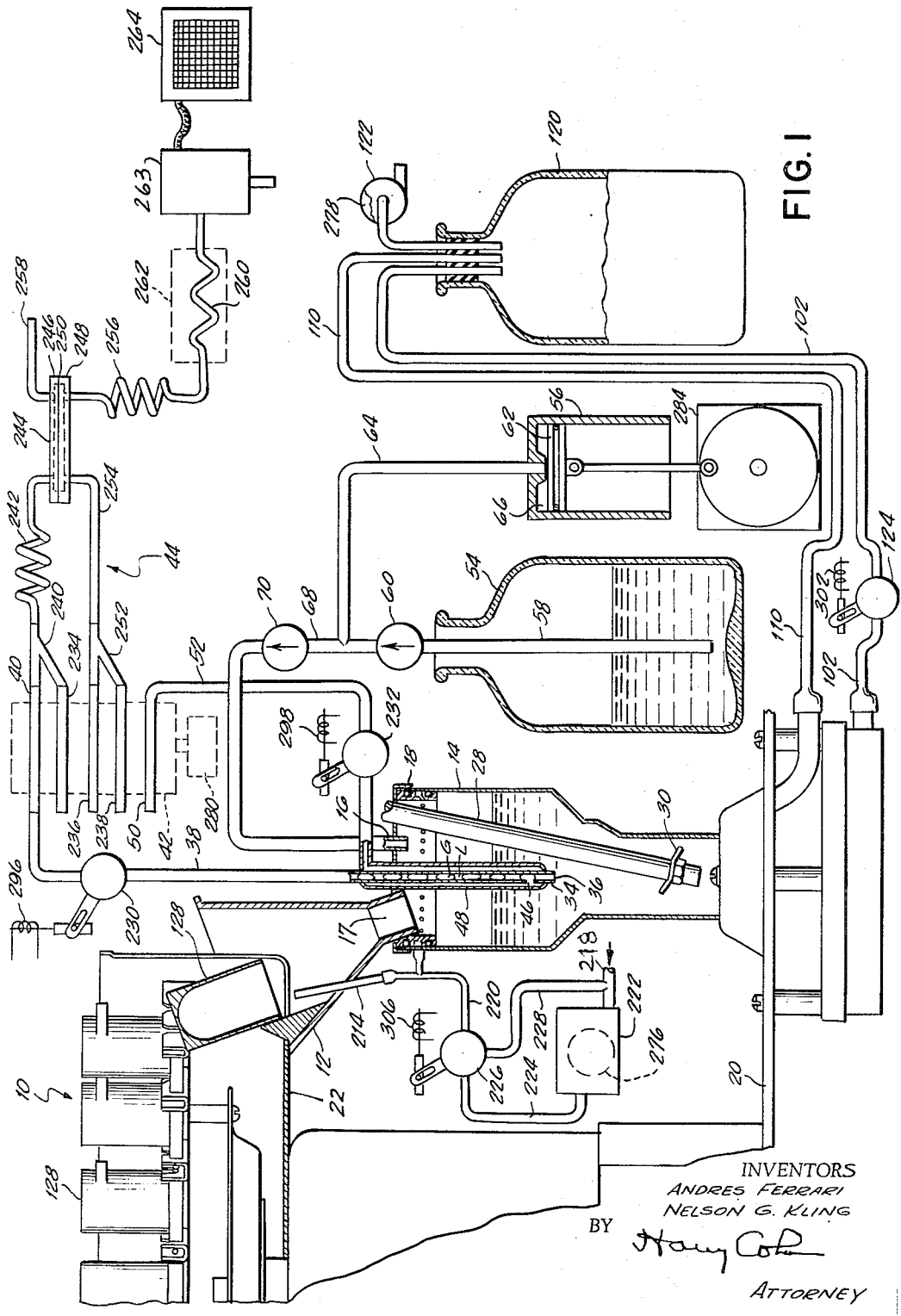
FIG. 1 is a more-or-less diagrammatic illustration of the apparatus of the present invention.

According to the invention, briefly described, a predetermined quantity of the solid material, which is to be treated and quantitatively analyzed with respect to a known constituent thereof, is introduced into a container in which a predetermined quantity of a carrier liquid is also introduced. The carrier liquid and material are mixed together to form a liquid in the container having the solid material homogeneously distributed throughout the liquid as a constituent thereof, in the form of a suspension or solution, depending upon the type of material undergoing analysis. A predetermined quantity of the constituent-containing liquid is withdrawn from the container, in the form of a stream, and the stream is treated, during its flow for analysis in respect to said ingredient. The treated stream is thereafter analyzed during its flow to provide a measurement of the quantity of the ingredient in the material. Any remaining liquid in the container is removed before the introduction of a successive quantity of solid material and carrier liquid, and between successive introductions of the material and carrier liquid, the container is washed. The apparatus is under the control of a programmer and the operation of the apparatus is repeated for the treatment and analysis of successive quantities of solid material, as desired or as required, and as determined by the programmer.

Referring now to the drawings in detail, the apparatus comprises a sample supply device 10 for measured separate quantities of the sold material, and the supply devise is operable to dispense the separate quantities of the material, in succession, to a chute 12 for introduction of the solid material into a container 14 for a carrier liquid which is introduced into the container through an inlet tube 16. The discharge end 17 of the chute extends through the cover 18 of the container and inlet tube 16 is supported on the cover. The container is supported on a platform 20 which also supports the housing 22 of the supply device 10, and the chute can be secured to the supply device in the position shown. As illustrated by FIG. 3, a mixer motor 24 is supported on top of cover 18 by a bracket 26 and the drive shaft 28 of the motor extends into the container and terminates near its bottom. A mixer 30, in the form of mixing blades, is secured to the end of the drive shaft and is operable to mix the predetermined quantities of solid material and carrier liquids which are introduced into the container. As illustrated by FIG. 6, the container has the lobular form indicated at 32 to prevent swirling of the liquid during the mixing operation, whereby the solid material is homogeneously distributed throughout the carrier liquid as a result of the mixing operation.

A liquid take-off tube 34 is suitably mounted on cover 18 and extends into container with its inlet end 36 at a level which is normally below the level of the liquid in the container. The tube extends from the container and is connected to a conduit 38 which is connected to a suction pump tube 40 of a proportioning pump 42 of an analyzer 44 for transmitting a predetermined quantity of the constituent-containing liquid from the container, in the form of a stream, for treatment and analysis.

The stream which is transmitted to the analyzer is segmentized by the introduction of air or other inert gas into the liquid which is introduced into the take-off tube 34 through its inlet end 36 to form a segmented stream in the take-off tube which comprises a series of longitudinally spaced liquid segments L separated from each other by intervening segments G of the gas. The gas segments help prevent any settling-out of the solid material in the carrier liquid as the latter is transmitted through the take-off tube so that the homogeneous distribution of the solid material throughout the liquid, as a result of the mixing operation, is not disturbed or disrupted. For segmentizing the liquid, take-off tube 34 is provided with an inlet opening 46 for the gas and a tube 48 surrounds the take-off tube. Tube 48 is connected to pump tube 50 of proportioning pump 42, via conduit 52, so that during operation of the proportioning pump, suction pump tube 40 is operable to aspirate a predetermined quantity of liquid from the container and, simultaneously with said aspiration, pump tube 50 is operable to introduce air or other inert gas through inlet opening 46, whereby the stream which is transmitted to analyzer 44 is segmentized.

Predetermined quantities of the carrier liquid, which may be a solvent for the solid material or which may be a vehicle for carrying the solid material, in the form of minute particles suspended in the liquid, is supplied from a reservoir 54 through the operation of a piston-type metering pump 56. A supply conduit 58 extends into the carrier liquid of the reservoir and a check valve 60 is provided in the supply conduit to permit flow of the carrier liquid in the indicated direction only during the intake stroke of piston 62 of the pump, so that predetermined quantity of carrier liquid is withdrawn from the reservoir and flows through conduit 64 into chamber 66 of the pump. Upon the delivery stroke of the pump, the same quantity of carrier liquid is transmitted through conduit 64 into a conduit 68 which is connected to inlet tube 16 for introducing the liquid into container 14. A check valve 70 is provided in conduit 68 to permit flow only in the direction indicated by the arrow. It will be understood that metering pump 56 is of the type that can be adjusted to deliver different predetermined quantities of liquid to container 14, as desired or as required, during an operating cycle of the pump.

The container 14 is provided with means for removing any remaining liquid therefrom between successive introductions of solid material and carrier material into the container. More particularly, and as best seen in FIGS. 1 and 3, the bottom of the container is provided with an outlet opening 72 which is controlled by a suction-operated diaphragm valve 74. More particularly, the valve comprises a disk-shaped valve member 76 which is adapted to open or close outlet 76 in accordance with the operation of the valve. The valve member is connected to a longitudinally movable rod 78 which is mounted for longitudinal sliding movement in a sleeve 80 which is supported in an inverted dish-shaped member 82 that is secured to plate 84 which is connected to platform 20 by the screws 86. The lower end of rod 78 is connected to the superimposed plates 88 and 90 and a movable diaphragm 92 is clamped between the plates. The marginal edge portion of the diaphragm is held between a ring 94 and a member 96. Screws 86 and spacers 98 secure ring 94 and member 96 to platform 20 in spaced relation therewith, as shown. Valve member 76 is biased into closing position by the compression springs 100 which are circumferentially spaced from each other and are seated in member 96 so that they are in operative engagement with plate 90 to bias rod 78 in a direction toward outlet opening 72 so that valve member 76 normally closes said opening.

It is to be noted that plate 88 and one side of the diaphragm, along the marginal edge thereof, are exposed to the atmosphere so that atmospheric pressure is applied to plate 88. A suction tube 102 is connected to member 96 and is in fluid flow communication with a chamber 104 which is defined by the other side of the diaphragm, along its marginal edge, and the space between the confronting surfaces of plate 90 and member 96. Accordingly, when suction is applied to chamber 104 via conduit 102, the atmospheric pressure on plate 88 is large enough to overcome the biasing forces of springs 100 so that valve 76 is opened for emptying container 14. The liquid is removed from the container through its outlet opening 72 by the aid of suction. More particularly, the bottom of the container is mounted on an inverted dish-shaped member 106 that is connected to platform 20 and which forms a chamber 108 that is in communication with container 14 when outlet 72 is open. A suction tube 110 is in communication with chamber 108 through opening 112 provided in plate 84. Accordingly, when outlet opening 72 is opened due to the application of suction to chamber 104, via conduit 102, suction is applied to the liquid in container 14, via conduit 110, opening 112 and chamber 102, respectively, whereby the liquid in the container is aspirated therefrom. An inverted dish-shaped member 114 is mounted on rod 78, and in the open position of valve member 76 covers member 82, in close relation therewith. Suitable seals 116 and 118 are provided to prevent leakage.

Conduits 102 and 110 are in fluid communication with a closed liquid receiver 120 which is maintained under vacuum by a vacuum pump 122. A solenoid-operated valve 124 is provided in conduit 102 and is normally in position so that the valve is open to the atmosphere whereby air is normally introduced into receiver 120 due to the continuously operated vacuum pump 122. When the solenoid of valve 124 is energized, the valve is closed to the atmosphere, receiver 120 is evacuated, and suction is applied to valve 74 through conduit 102 to open outlet 72. Simultaneously, the same vacuum is applied to container 14, via conduit 110, whereby the liquid remaining in the container is aspirated therefrom concurrently with the opening of container outlet 72.

As indicated above, the sample supply device 10 is operated to deliver measured quantities of solid material, in the form of tablets, powder or otherwise, individually and in successsion to chute 12 for introduction into container 14. The supply device comprises an intermittently rotary carrier 126 which holds a seriesof receptacles 128 for the solid material and the receptacles are arranged on the carrier in a circular row for movement, in succession, to a discharge station generally indicated at 130, which is the position at which the chute 12 is located. The receptacles are arranged on the carrier so that as each receptacle is positioned at the discharge station, it moves into an inverted position, as shown in FIGS. 1 and 3, for discharging its contents of solid material into the chute. For this purpose, the upper surface of the carrier, which is a ring-shaped circular plate, is provided with a series of circumferentially spaced U-shaped receptacle supporting clips 132, arranged in a row, for pivotally supporting the receptacles. The arms of the clips are provided with open top slots 134 which support pivot pins 136 that extend from the sides of the receptacles. Each receptacle is so constructed and the pivot pins 136 are so arranged that in the mounted position of the receptacles on the carrier, the receptacles are normally biased, by gravity, for pivotal movement outwardly from an upstanding material-holding position to an inverted material-discharging position.

The receptacles are normally retained in an upstanding material-holding position by a ring 138 which extends upwardly from the base 140 of a dish-like enclosure 142 for the carrier and its receptacles. The inner surface of the ring is adjacent the receptacles so that the receptacles engage the ring and are thereby held and prevented from rotating into an inverted discharging position. The ring is pivoted with an opening or cutout 144 at the discharge station, so that as each receptacle moves into position, in succession, at the discharge station, it disengages ring 138 and pivots downwardly into the inclined discharge position shown in FIGS. 1 and 3 for discharging its contents into chute 12. It will be understood that base 140 is provided with an opening 146 at said position to permit the flow of material from the receptacle into the chute, and the chute can be provided with a stop 148 in the path of movement of the receptacle so that the receptacle is positioned for discharging its contents in the manner shown.

Figure 2:
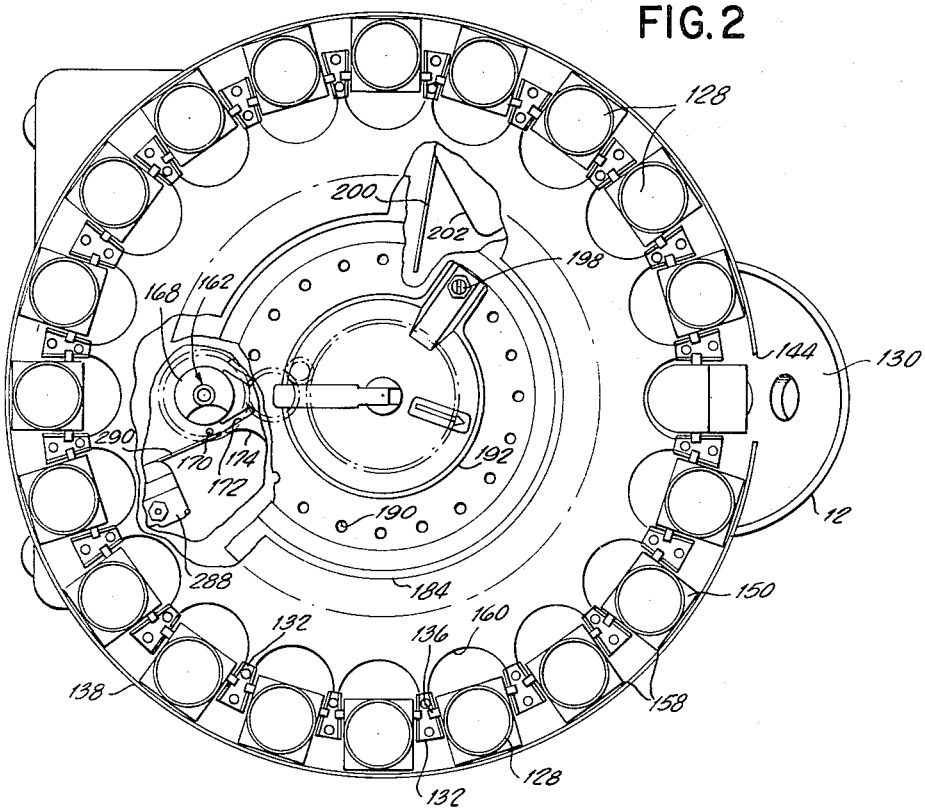
FIG. 2 is a top plan view, with portions cut away, of a sample supply device according to the present invention.
Figure 7:
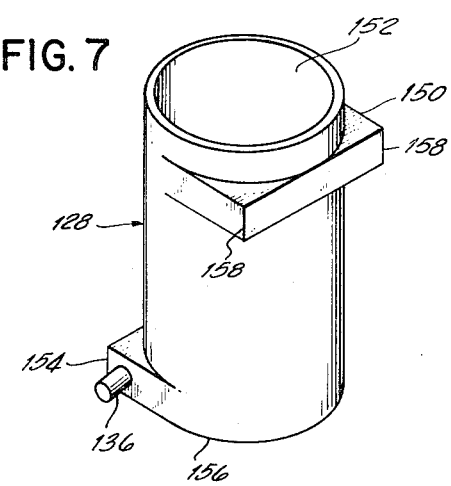
FIG. 7 is a perspective view of a receptacle for the solid material.

As best seen in FIG. 7, each receptacle is preferably made from a suitable plastic material and comprises an open top hollow cylindrical container having a shoulder part 150 extending laterally outwardly from the longitudinal axis of the receptacle, near the open top 152 thereof, and a similar shoulder part 154 extending laterally outwardly from the longitudinal axis of the receptacle, at the closed bottom 156 thereof, but in a direction which is diametrically opposite the first mentioned shoulder part 150. The pivot pins 136 are in axial alignment and the longitudinal axis of the pins extends transversely of the longitudinal axis of the receptacle and is laterally spaced from said last mentioned axis in a direction which is diametrically opposite the lateral extent of shoulder part 150. In this manner, the positioning of the pivot pins 136 and the shoulder part 150, and the relation of the pins and part 150 with respect to the remaining parts of the receptacle, results in the receptacles being gravity biased into an inverted discharging position when supported on the pivot pins 136. It is to be noted, as best seen in FIG. 2, that the opposite corners 158 of shoulder part 150 are the only parts of the receptacles which engage ring 138. To prevent interference with the discharge movement of the receptacles, the carrier plate 126 is provided with a series of cutouts 160 along its marginal edge, at each position of a receptacle, as shown in FIGS. 2 and 3.

The carrier is operated for intermittent rotation by a Geneva drive mechanism 162, as described in U.S. Patent No. 3,038,340 issued June 12, 1962. Briefly described, housing 22 is provided with a motor 164 which is connected, through a gear train 166 to the Geneva drive member 168, whose drive pin 170 is operated to engage, in succession, the slots 172 of the Geneva driven member 174 which operates rotary shaft 176 through gears 178. The upper end of shaft 176 is provided with a collar 180 which carries a support 182 that is removably mounted thereon. Support 182 carries a dish-shaped plate 184 and a clamp 186 clamps plate 184 to support 182 for rotation with shaft 176. Carrier 126 is connected to plate 184 by screws 188, so that intermittent rotation of shaft 176, as determined by the Geneva drive mechanism 162, intermittently rotates the carrier.

Plate 184 is provided with a series of indexing holes 190 and, as seen in FIG. 2, an indexing hole is provided for each receptacle. Clamp 186 comprises a spring plate 192 which is clamped against plate 184 by the action of handle 194 which is mounted for rotation in the bifurcated upstanding part 196 that extends from shaft 176. The handle is provided with a cam surface (not shown) which, in the clamping position shown in FIG. 2, engages spring plate 192 so that it is clamped against plate 184 which, in turn, is clamped against support 182. The spring plate carries an indexing pin 198 which may be placed in any one of holes 190. The operating lever 200 of a microswitch 202 (FIG. 2) is positioned in the path of movement of pin 198 for operating the switch and for stopping the indexing movement of the supply device, as fully described in the above mentioned U.S. Patent No. 3,038,340.

Figure 4:
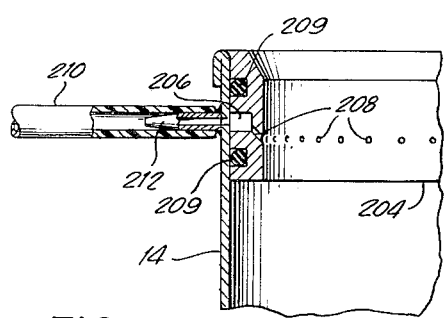
FIG. 4 is a vertical sectional detail view of a part of the supply device.

The apparatus includes provision for washing container 14 between successive introductions of solid material and carrier liquid into the container and, in addition, the apparatus includes provision for washing each of the receptacles after the discharge of material into the chute, and also includes provision for washing the inside wall of the chute which is contacted by the solid material. More particularly and as best seen in FIGS. 3 and 4, the inside wall of the container is provided with a ring 204 near the top of the container. The ring has a liquid transmitting passage 206 and a series of downwardly inclined passages 208 are circumferentially spaced around the ring and connect passage 206 with the interior of the container. O-rings 209 prevent leakage of the wash liquid. A wash liquid supply conduit 210 is connected to a nipple 212 which extends from the side of container 14 and is in communication with passage 206. The wash liquid, which may be water, is transmitted through passage 206, from conduit 210, and the wash liquid enters the container in the form of a fine spray which is directed downwardly against the walls of the container for removing any material which may be deposited on the container.

Chute 12 (FIG. 3) is provided with a tube 214 which is positioned in relation to the inverted receptacle 128 so that it directs a stream of wash liquid to the internal walls of the receptacle for washing it and, for this purpose, the bottom 216 of the receptacle is circular to provide a smooth unobstructed surface that insures that no material is entrapped in the cup after it has been washed. The wash liquid is supplied to tube 14 via conduit 218, and a conduit 220 delivers wash liquid to conduits 210 and 218.

As shown in FIG. 1, the wash liquid is supplied by a pump 222 which transmits wash liquid to conduit 220 via conduit 224 and solenoid operated valve 226. Another conduit 228 connects the valve to the inlet end of the pump. The pump is continuously operated during the operation of the apparatus and, in one position of the valve, delivers wash liquid through conduit 220 and, in the other position of the valve, the wash liquid is circulated back to the pump via conduit 228.

The transmission of the segmented sample stream from container 14 to the automatic analysis apparatus 44 is controlled by a solenoid-operated valve 230 which, in its de-energized position, has its inlet open to atmosphere. The supply of segmentizing air to the take-off tube 34 is controlled by a solenoid-operated valve 232 which, in its de-energized condition, has its inlet also opened to the atmosphere. The function and operation of these valves will be more clearly understood hereinafter.

The analyzing apparatus 44 is of the type shown and described in U.S. Patent No. 2,797,149 issued June 25, 1957. Briefly described, the analysis apparatus comprises the previously mentioned proportioning pump 42, which is preferably of the type shown in U.S. Patent No. 2,935,028 issued May 6, 1960. The pump has a series of resiliently compressible pump tubes of which tubes 40 and 50 have been mentioned previously. In addition, pump tubes 234, 236 and 238 are also provided. The pump tubes are simultaneously engaged by a series of tube-collapsing rollers (not shown) which are movable longitudinally of the tubes for the pumping operation. Pump tube 40 is a suction tube, as previously indicated, and is connected to take-off tube 34, via conduit 38, for withdrawing predetermined quantities of liquid from the container, by aspiration, and the withdrawn liquid, in the form of a segmented stream is transmitted to fitting 240, where it joins a stream of a liquid reagent supplied to pump tube 234. The liquid reagent which is transmitted through pump tube 234 is of a type that reacts with the ingredient of the solid material which is carried by the liquid to form a reaction product in a quantity corresponding to the quantity of the ingredient in the material, and the reaction product is of a type that can be treated for colorimetric analysis. A portion of the reagent joins each of the liquid segments and the resulting stream is transmitted to the horizontal helical mixing coil 242 for mixing of the constituents of each liquid segment with each other.

As described in the above mentioned U.S. Patent No. 2,797,149, the gas segments of the segmented stream wipe the internal walls of the passages of the apparatus clean and help prevent contamination of one liquid segment due to deposits of material from a preceding liquid segment. Thus it is seen that the gas introduced into the take-off tube 34 for segmentizing the liquid, functions to prevent settling-out of the solid material as it is introduced into the take-off tube and as it flows through said take-off tube, as well as keeping the internal walls of the passages of the apparatus clean.

From the mixing coil, the mixed stream is transmitted to a separating device 244, herein shown as a dialyzer, for removing any materials from the stream which might interfere with the analysis. The dialyzer is preferably of the type shown and described in U.S. Reissue Patent No. Re. 24,736 issued November 17, 1959 and, briefly described, comprises a pair of plates 246 and 248 separated from each other by a dialyzer membrane 250. The plates are provided with passages which are in confronting relation with each other at opposite sides of the membrane, so that a portion of the reaction product diffuses through the membrane into a recipient stream which is simultaneously transmitted through the passage at the other side of the membrane. The recipient stream comprises a gas segmented stream containing a color producing reagent which is introduced into the apparatus via pump tube 236, and the gas is introduced into the apparatus via pump tube 238. The gas and color producing stream join each other at fitting 252 and the resulting segmented recipient stream is transmitted to the dialyzer via conduit 254.

The recipient stream, containing the portion of the reaction product which diffuses through membrane 250, is transmitted from the dialyzer to another horizontal helical mixing coil 256 wherein the constituents of each liquid segment are mixed together. The sample stream from container 14 is discharged from the dialyzer through outlet 258 and may be discarded or saved as desired or as required.

While the separating device has been described as a dialyzer, it will be understood that other separating devices, of the continuous type, can also be used, for example, a continuous filter of the type shown and described in the U.S. patent application of Leonard T. Skeggs, Serial No. 36,583 filed June 16, 1960. Of course, the separating device may be dispensed with when the sample stream is of the type which does not contain any interfering substances as, for example, where the liquid from container 14 contains a solution of the solid material rather than a suspension where some of the particles might settle out and interfere with the analysis.

As a result of the mixing operation and the passage of the stream through a coil 260 immersed in a heating bath 262, a color is formed in the stream having an intensity corresponding to the quantity of the reaction product in the liquid of the stream. The colored stream is transmitted from the heating bath to a vented flow cell (not shown) of a colorimeter 263 for removal of the air segments before the colorimetric examination of the liquid by the colorimeter, and the results of the colorimetric examination are recorded on the recorder 264.

Figure 8:
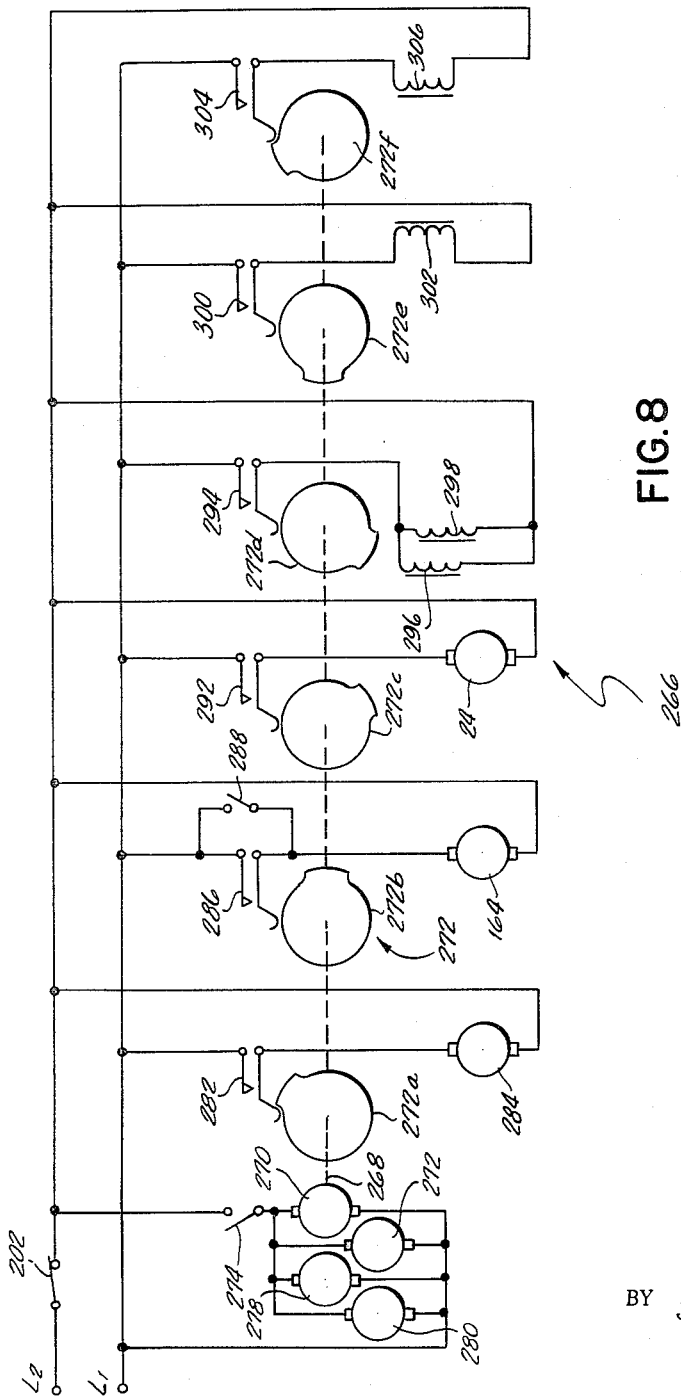
FIG. 8 is a wiring diagram illustrating the electrical controls of the apparatus.

The operation of the apparatus is controlled by a programmer 266 (FIG. 8) which operates the various parts of the apparatus to effect an operating cycle as follows:

Metering pump 56 is operated to introduce a metered quantity of the carrier liquid into container 14. The sample supply device 10 is operated to dispense a predetermined quantity of solid material into the container. The mixer 30 is then operated to mix the carrier liquid and solid material together whereby the solid material is either dissolved in the carrier liquid or is homogeneously dispersed throughout the carrier liquid as a fine suspension therein. After the mixing operation, the take-off tube 34 and the gas segmentizing tube 48 are operated, through the operation of valves 230 and 232, for the aspiration of a predetermined quantity of carrier liquid from the container, in the form of a gas segmentized stream, which is transmitted through analyzer 44 for treatment and analysis with respect to the quantity of the ingredient in the solid material. Suction-operated valve 74 is then operated for the withdrawal of any remaining liquid from container 14. While outlet 72 of the container remains open, wash liquid is transmitted through tube 214 and passage 206 for washing the receptacle, portions of the inner wall of chute 12, and the inner wall of container 14, and the wash liquid is discharged from the container through outlet 72. At this time, the apparatus has gone through one operating cycle and is in position for a repetition of the cycle for treatment and analysis of another and succeeding quantity of solid material. During successive indexing movements of carrier 126 of the supply device 12, the washed receptacles remain in their inverted discharging position and are manually moved into upright position subsequently for receiving new material.

The programmer 266 comprises a cam shaft 268 operated by a motor 270. A series of cams 272 are provided on the cam shaft for determining and controlling the sequence of operations indicated above. The operation of the apparatus, as controlled by the programmer, will now be described in detail. To start the operation of the apparatus, starting switch 274 is closed to energize the cam motor 270. It is to be noted that the normally closed contacts of switch 202, which is provided on the supply device 10 for controlling the number of operating cycles of the apparatus, is in series with power line $L_2$, so that when the switch is operated by pin 198, at the completion of the operating period for the apparatus, all power is disconnected from the apparatus for stopping its operation. Closing of switch 274 energizes motor 276 for the wash liquid pump 222, motor 278 for vacuum pump 122, and motor 280 for proportioning pump 42. Rotation of cam shaft 268 moves cam 272a into position to close the contacts of switch 282 to complete an energization circuit to motor 284 of the metering pump 56 for introduction of a predetermined quantity of carrier liquid into container 14 through inlet tube 16. At the completion of the metering operation, cam 272b moves into position to close the contacts of switch 286 and complete an energization circuit to motor 164 of the sample supply device 10, and carrier 126 is moved to position a receptacle 128 at the discharge station 130 for dispensing a predetermined quantity of solid material into container 14. The sample supply device is provided with a microswitch 288 whose contacts are normally open. The operating arm 290 of the microswitch (FIG. 2) is in the path of movement of the Geneva drive pin 170 and is engaged by said pin when a receptacle is at the discharge station, whereby the contacts of the switch 288 are opened. Closing of the contacts of switch 286 results in initial operation of motor 164 so that the Geneva drive pin 170 moves into position to release the operating arm of microswitch 288 so that the contacts of the switch close and, thereafter, the contacts of switch 286 open, but the indexing movement of the supply device continues until the succeeding receptacle is positioned at the discharge station, at which time the contacts of switch 288 open to stop the indexing movement of the supply device.

After a predetermined quantity of solid material has been dispensed into container 14, cam 272c moves into position to close the contacts of switch 292 to energize mixer motor 24 for a predetermined period of time, as determined by the rise of cam 272c, for mixing the carrier liquid and solid material together to form a homogeneous liquid containing the solid material as a constituent thereof.

At the completion of the mixing operation, cam 272d moves into position to close the contacts of switch 294 to energize the solenoids 296 and 298 of valves 230 and 232, respectively, the valves are moved into position for connecting take-off tube 34 and gas supply tube 48 to their respective pump tubes 40 and 50 for withdrawing a predetermined quantity of the constituent-containing carrier liquid, in the form of a segmented stream, which is transmitted to the analyzer 44 for treatment and analysis. The quantity of liquid withdrawn from the container is determined by the rise of cam 272d, the linear speed of the compressing rollers of proportioning pump 42, and the internal diameter of pump tube 40, as is well understood. Opening of the contacts of switch 294, as determined by the position of cam 272d, results in the de-energization of the solenoids, which are spring biased, to return the valves to their initial position whereby their inlets are connected to the atmosphere so that continued operation of proportioning pump 42 of the analyzer does not result in the withdrawal of any additional carrier liquid and does not result in the introduction of any additionaly segmentizing air into the take-off tube 34.

At the completion of the withdrawal operation, cam 272e moves into position to close the contacts of switch 300 to complete an energization circuit to solenoid 302 which operates valve 124, so that chamber 104 of the suction-operated diaphragm valve 74 is connected to the vacuum created in receiver 120 by the action of vacuum pump 122. Valve member 76 is operated to open outlet 72 of container 14, thereby exposing container 14 to the vacuum of receiver 120 and any remaining liquid in container 14 is aspirated therefrom.

While valve member 76 is still open, cam 272f moves into position to close the contacts of switch 304 and complete an energization circuit to the solenoid 306 of valve 226, so that wash liquid is delivered to the inverted receptacle 128 and container 14, in the manner previously described. At the completion of the wash cycle, cam 272e moves into position to release the contacts of switch 300 so that outlet 72 of container 14 is closed.

The apparatus has now completed an operating cycle and is in position to begin another operating cycle. The number of operating cycles continues until pin 198 moves into position to engage the operating arm 200 of microswitch 202, at which time the contacts of the switch open to de-energize the apparatus.

While it will be understood that the apparatus has general application with respect to the treatment and analysis of solid material in respect to an ingredient thereof, the apparatus is particularly useful with respect to pharmaceutics, especially the determination of a quantity of an ingredient in a medicinal tablet.

While we have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. Apparatus for treating solid material for on-stream automatic quantitative analysis with respect to a known ingredient thereof, comprising a container having inlet means for said material and a carrier liquid therefor to form a liquid in the container containing said material as a constituent thereof, take-off means positioned in said container for withdrawing a quantity of said constituent-containing liquid from said container, said container having an outlet opening for the removal of liquid not withdrawn from said container by said withdrawing means, suction-operated valve means for controlling said outlet opening, first valve means operable for controlling the application of suction to said withdrawing means, second valve means operable for controlling the application of suction to said suction-operated valve, and means for controlling the operation of said first and second valve means for operating said suction-operated valve after the operation of said withdrawing means.

2. Apparatus for treating solid material for on-stream automatic quantitative analysis with respect to a known ingredient thereof, comprising a container having inlet means for said material and a carrier liquid therefor to form a liquid in the container containing said material as a constituent thereof, means positioned in said container for withdrawing a quantity of said constituent-containing liquid from said container, said container having outlet means for the removal of liquid not withdrawn from said container by said withdrawing means, suction-operated valve means for opening and closing said outlet means, means for connecting said container in communication with a source of suction when said outlet means is opened by said suction-operated valve for removing the liquid from said container by aspiration, and valve means operable for controlling the application of suction to said suction-operated valve means, whereby application of suction to said valve means opens said outlet means for aspiration of said last mentioned liquid from said container.

3. Apparatus for treating solid material for on-stream automatic quantitative analysis with respect to a known ingredient thereof, comprising a container having inlet means for said material and a carrier liquid therefor to form a liquid in the container containing said material as a constituent thereof, a take-off tube positioned in said container for withdrawing a quantity of said constituent-containing liquid from said container, in the form of a stream, a conduit extending from said take-off tube for transmitting said stream and adapted to be connected to a source of suction for withdrawing said constituent-containing liquid from said container through said take-off tube by aspiration, valve means connected to said conduit and operable to control the application of suction to said take-off tube to thereby control the withdrawing operation, said container having means operable for removing liquid from said container which has not been withdrawn therefrom by said take-off tube, and means for controlling the operation of said valve means and said liquid removing means so that the latter is operated after said withdrawing operation.

4. Apparatus for treating solid material for on-stream automatic quantitative analysis with respect to a known ingredient thereof, comprising a container having inlet means for said material and a carrier liquid therefor to form a liquid in the container containing said material as a constituent thereof, a take-off tube positioned in said container for withdrawing a quantity of said constituent-containing liquid from said container, in the form of a stream, a conduit extending from said take-off tube for transmitting said stream and adapted to be connected to a source of suction for withdrawing said constituent-containing liquid from said container through said take-off tube by aspiration, valve means connected to said conduit and operable to control the application of suction to said take-off tube to thereby control the withdrawing operation, said container having an outlet opening for the removal of liquid which has not been withdrawn from said container by said take-off tube, suction-operated valve means for controlling said outlet opening, other valve means operable for controlling the application of suction to said suction-operated valve, and means for controlling the operation of said first-mentioned valve means and said other valve means so that said suction-operated valve is operated to open said outlet opening after the withdrawing operation.

5. Apparatus for treating solid material for on-stream automatic quantitative analysis with respect to a known ingredient thereof, comprising a container having inlet means for said material and a carrier liquid therefor to form a liquid in the container containing said material as a constitutent thereof, a take-off tube positioned in said container for withdrawing a quantity of said constituent-containing liquid from said container, in the form of a stream, a conduit extending from said take-off tube for transmitting said stream and adapted to be connected to a source of suction for withdrawing said constituent-containing liquid from said container through said take-off tube by aspiration, valve means connected to said conduit and operable to control the application of suction to said take-off tube to thereby control the withdrawing operation, another tube in fluid flow communication with said take-off tube for introducing an inert gas into said take-off tube to segmentize said liquid as it flows into said take-off tube into a series of longitudinally spaced liquid segments separated from each other by an intervening segment of said gas, conduit means connected to said other tube for transmitting said inert gas thereto, other valve means in said conduit means operable for controlling the flow of gas therethrough, and means for controlling the operation of said first mentioned valve means and said other valve means to control said aspirating action and said segmentizing action.

6. Apparatus for treating solid material for on-stream automatic quantitative analysis with respect to a known ingredient thereof, comprising a container having inlet means for said material and a carrier liquid therefor to form a liquid in the container containing said material as a constitutent thereof, a take-off tube positioned in said container for withdrawing a quantity of said constituent-containing liquid from said container, in the form of a stream, a conduit extending from said take-off tube for transmitting said stream and adapted to be connected to a source of suction for withdrawing said constitutent-containing liquid from said container through said take-off tube by aspiration, valve means connected to said conduit and operable to control the application of suction to said take-off tube to thereby control the withdrawing operation, another tube in fluid flow communication with said take-off tube for introducing an inert gas into said take-off tube to segmentize said liquid as it flows into said take-off tube into a series of longitudinally spaced liquid segments separated from each other by an intervening segment of said gas, conduit means connected to said other tube for transmitting said inert gas thereto, other valve means in said conduit means operable for controlling the flow of gas therethrough, said container having means operable for removing liquid from said container which has not been withdrawn therefrom by said take-off tube, and means for controlling the operations of said first mentioned valve means, said other valve means, and said liquid removing means to stop said aspirating action and said segmentizing action before the operation of said liquid removing means.

7. Apparatus for treating solid material for on-stream automatic quantitative analysis with respect to a known ingredient thereof, comprising a container for a carrier liquid for the material, means for introducing predetermined quantities of said material and said carrier liquid into said container during spaced intervals of time, mixer means operably disposed in said container for mixing said material with said liquid after said material and said carrier liquid have been introduced into said container to form a liquid containing said material as a constituent thereof, means, fluid-flow coupled to said container, operable between successive introductions of said material and said carrier liquid for withdrawing at least a portion of said constituent-containing liquid, in the form of a stream, from said container, said container having a bottom and an outlet therein, valve means normally closing said outlet and automatically operable at the completion of the withdrawing operation for opening said outlet to remove liquid which has not been withdrawn from said container and before the introduction of succeeding solid material and carrier liquid.

8. Apparatus for treating solid material for on-stream automatic quantitative analysis with respect to a known ingredient thereof, comprising a container for a carrier liquid for the material, means for introducing predetermined quantities of said material and said carrier liquid into said container during spaced intervals of time, mixer means positioned in said container for mixing said material with said liquid to form a liquid containing said material as a constituent thereof, means operable between successive introductions of said material and said carrier liquid for withdrawing at least a portion of said constitutent-containing liquid, in the form of a stream, from said container, said container having a bottom and an outlet therein, vallve means normally closing said outlet and automatically operable at the completion of the withdrawing operation for opening said outlet to remove liquid which has not been withdrawn from said container and before the introduction of succeeding solid material and carrier liquid, said valve means having a valve normally biased into position closing said outlet, a movable diaphragm connected to said valve for moving the latter into position to open said outlet, and a chamber positioned at one side of said diaphragm and adapted to be placed under sub-atmospheric pressure to move said valve into said open position.

9. Apparatus for treating solid material for on-stream automatic quantitative analysis with respect to a known ingredient thereof, comprising a container for a carrier liquid for the material, means for introducing predetermined quantities of said material and said carrier liquid into said container during spaced intervals of time, mixer means operably disposed in said container for mixing said material with said liquid after said material and said carrier liquid have been introduced into said container to form a liquid containing said material as a constituent thereof, means, fluid-flow coupled to said container, operable between successive introductions of said material and said carrier liquid for withdrawing at least a portion of said constituent-containing liquid, in the form of a stream, from said container, said container having a bottom and an outlet therein, suction operated valve means normally closing said outlet and automatically operable at the completion of the withdrawing operation for opening said outlet to remove liquid which has not been withdrawn from said container and before the introduction of succeeding solid material and carrier liquid.

10. Apparatus for treating solid material for on-stream automatic quantitative analysis with respect to a known ingredient thereof, comprising a container having inlet means for said material and a carrier liquid therefor to form a liquid in said container containing said material as a constituent thereof, means positioned in said container for withdrawing a quantity of said constituent-containing liquid from said container in the form of a stream, said container having outlet means for the removal of liquid which has not been withdrawn from said container by said withdrawing means, first valve means operable to close and open said outlet means, second valve means operable for controlling the operation of said withdrawing means, and means controlling the operation of said first and second valve means for opening said outlet means after the completion of the withdrawing operation.

11. Apparatus for treating solid material for on-stream automatic quantitative analysis with respect to a known ingredient thereof, comprising a container having inlet means for said material and a carrier liquid therefor to form a liquid in said container containing said material as a constituent thereof, a take-off tube positioned in said container for withdrawing a quantity of said constituent-containing liquid from said container in the form of a stream, suction means connected to said take-off tube for withdrawing said constituent-containing liquid by aspiration through said take-off tube, first valve means operable for controlling the operation of said suction means, said container having outlet means for the removal of liquid which has not been withdrawn from said container by said take-off tube, suction operated valve operable to close and open said outlet means, second valve means operable for controlling the application of suction to said suction operated valve means, and means for controlling the operation of said first and second valve means to operate said suction operated valve means after the completion of the withdrawal operation.

12. Apparatus for treating solid material for on-stream analysis with respect to an ingredient thereof, comprising a container for a carrier liquid for the material, means for introducing predetermined quantities of said material and said carrier liquid into said container during spaced intervals of time, mixer means operably disposed in said container for mixing said material with said liquid after said material and said carrier liquid have been introduced into said container to form a liquid containing said material as a constituent thereof, means, fluid-flow coupled to said container, operable between successive introductions of said material and said carrier liquid for withdrawing at least a portion of said constituent-containing liquid, in the form of a stream, from said container, said withdrawing means including a take-off tube extending into said container, conduit means connected to said take-off tube for transmitting the withdrawn liquid stream to an analyzer, suction means connected to said conduit means for aspirating said liquid from the container through said take-off tube, valve means connected to said conduit means and operable to connect said take-off tube to said suction means for the withdrawing operation, said container having means operable for removing liquid from said container which has not been withdrawn therefrom by said take-off tube, and means, coupled to said valve means and said liquid removing means, for controlling the operation of said valve means and said liquid removing means so that the latter is operated after said withdrawing operation.

13. Apparatus for treating solid material for on-stream analysis with respect to an ingredient thereof, comprising a container for a carrier liquid for the material, means for introducting predetermined quantities of said material and said carrier liquid into said container during spaced intervals of time, mixer means positioned in said container for mixing said material with said liquid to form a liquid containing said material as a constituent thereof, means operable between successive introductions of said material and said carrier liquid for withdrawing at least a portion of said constituent-containing liquid, in the form of a stream, from said container, said withdrawing means including a take-off extending into said container, conduit means connected to said take-off tube for transmitting the withdrawn liquid stream to an analyzer, suction means connected to said conduit means for aspirating said liquid from the container through said take-off tube, valve means connected to said conduit means and operable to connect said take-off tube to said suction means for the withdrawing operation, said container having an outlet opening for the removal of liquid which has not been withdrawn from said container by said take-off tube, suction-operated valve means for controlling said outlet opening, other valve means operable for controlling the application of suction to said suction-operated valve, and means for controlling the operation of said first mentioned valve means and said other valve means so that said suction-operated valve is operated to open said outlet opening after the withdrawing operation.

14. Apparatus for treating solid material for on-stream automatic quantitative analysis with respect to a known ingredient thereof, comprising a container having inlet means for said material and a carrier liquid therefor to form a liquid in the container containing said material as a constituent thereof, means operable automatically for introducing into said container at intervals a quantity of liquid and a quantity of said material to form a series of separate batches of liquid, each containing the material for said analysis, automatically operable means for transmitting at least some of each liquid batch in succession from said container to the automatic analysis apparatus, means operable automatically to wash said container after each of said batches of liquid transmitted for analysis and before the introduction of the next batch of liquid and the companion quantity of material into said container; and control means, coupled to said introducing means, said transmitting means, and said washing means, operable to actuate these means sequentially and cyclically.

15. Apparatus for treating solid material for on-stream automatic quantitative analysis with respect to a known ingredient thereof, comprising a container having inlet means for said material and a carrier liquid therefor to form a liquid in the container containing said material as a constituent thereof, means operable automatically for introducing into said container at intervals a quantity of liquid and a quantity of said material to form a series of separate batches of liquid, each containing the material for said analysis, automatically operable means valve controlled for transmitting at least some of each liquid batch in succession from said container to the automatic analysis apparatus, and means operable automatically to wash said container after each of said batches of liquid is transmitted for analysis and before the introduction of the next batch of liquid and the companion quantity of material into said container.

16. Apparatus for supplying a series of quantities of solid material individually and in succession for on-stream automatic quantitative analysis with respect to a known ingredient thereof, comprising a carrier for a series of open-top receptacles for holding individual quantites of said material, means mounting said receptacles on said carrier for movement from a retracted upright position into an inverted position for discharging the solid material from the receptacle, means mounting said carrier for intermittent movement to position each of said receptacles, in succession, at a delivery station for said material, and means at said delivery station for moving the receptacle at said station into said operative material-discharging position.

17. A receptacle for holding and delivering a quantity of material for on-stream automatic quantitative analysis with respect to a known ingredient thereof, comprising an open top container having a hollow body portion and a closed bottom, a pair of pivot pins near said bottom and extending outwardly from the outer surface of said body portion, said pivot pins being in axial alignment and being positioned so that the longitudinal axis of said pins is positioned laterally of the longitudinal axis of said body portion and extends transversely thereof, said body portion having a weighted part near its open top, said weighted part being laterally spaced from said longitudinal axis of said body portion in a direction which is opposite to the direction of the lateral spacing of said longitudinal axis of said pivot pins from said longitudinal axis of said body portion, so that when said receptacle is supported in an upright position on said pivot pins, said weighted part biases said receptacle into a downwardly inclined position.

18. Apparatus for treating solid material for on-stream automatic quantitative analysis with respect to a known ingredient thereof, comprising a container having inlet means for said material and a carrier liquid therefor to form a liquid in the container containing said material as a constituent thereof, means operable automatically for introducing into said container at intervals a quantity of liquid and a quantity of said material to form a series of separate batches of liquid, each containing the material for said analysis, said means for introducing a quantity of said material at intervals into said container comprising a carrier for a series of open-top receptacles for holding individual quantities of said material, means mounting said receptacles on said carrier for movement from a retracted upright position into an inverted position for discharging the solid material from the receptacle, means mounting said carrier for intermittent movement to position each of said receptacles, in succession, at a delivery station for the delivery of said material to said container, means at said delivery station for moving the receptacle at said station into said operative material-discharging position, automatically operable means for transmitting at least some of each liquid batch in succession from said container to the automatic analysis apparatus, and means operable automatically to wash said container after each of said batches of liquid transmitted for analysis and before the introduction of the next batch of liquid and the companion quantity of material into said container.

19. Apparatus for treating solid material for on-stream automatic quantitative analysis with respect to a known ingredient thereof, comprising a container having inlet means for said material and a carrier liquid therefor to form a liquid in the container containing said material as a constituent thereof, means operable automatically for introducing into said container at intervals a quantity of liquid and a quantity of said material to form a series of separate batches of liquid, each containing the material for said analysis, said means for introducing a quantity of said material at intervals into said container comprising a carrier for a series of open-top receptacles for holding individual quantities of said material, means mounting said receptacles on said carrier for movement from a retracted upright position into an inverted position for discharging the solid material from the receptacle, means mounting said carrier for intermittent movement to position each of said receptacles, in succession, at a delivery station for the delivery of said material to said container, means at said delivery station for moving the receptacle at said station into said operative material-discharging position, automatically operable means for transmitting at least some of each liquid batch in succession from said container to the automatic analysis apparatus, means operable automatically to wash said container after each of said batches of liquid transmitted for analysis and before the introduction of the next batch of liquid and the companion quantity of material into said container, means operable to wash each of said receptacles when they are in said inverted positions, respectively, at said delivery station; and control means, coupled to said introducing means, said transmitting means, and said washing means, operable to actuate these means sequentially and cyclically.

References Cited by the Examiner

UNITED STATES PATENTS

| | | | |
|---|---|---|---|
| 476,610 | 6/1892 | Crary | 222—144 |
| 1,183,111 | 5/1916 | Pettermann | 222—144 |
| 3,111,390 | 11/1963 | Taylor | 23—253 |

MORRIS O. WOLK, *Primary Examiner.*

DELBERT E. GANTZ, *Examiner.*